United States Patent [19]  [11] 4,370,451
Stoy  [45] Jan. 25, 1983

[54] NOVEL BLOCK COPOLYMERS INCLUDING ACRYLONITRILE SEQUENCES AND SEQUENCES INCLUDING UNITS DERIVED FROM GLUTARIMIDE UNITS AND PROCESSES FOR PREPARING SAME

[75] Inventor: Vladimir A. Stoy, Princeton, N.J.

[73] Assignee: S.K.Y. Polymers, Princeton, N.J.

[21] Appl. No.: 346,417

[22] Filed: Feb. 8, 1982

Related U.S. Application Data

[63] Continuation-in-part of Ser. No. 166,032, Jul. 7, 1980, and a continuation-in-part of Ser. No. 188,060, Sep. 17, 1980, Pat. No. 4,337,327.

[51] Int. Cl.$^3$ .................... C08F 220/48; C08F 293/00
[52] U.S. Cl. .................................... 525/294; 525/280; 525/296; 525/374; 525/379; 525/327.1; 525/328.4
[58] Field of Search ............... 525/280, 294, 336, 374, 525/379

[56] References Cited

U.S. PATENT DOCUMENTS

| | | | |
|---|---|---|---|
| 2,940,952 | 6/1960 | Miller | 525/294 |
| 3,897,382 | 7/1975 | Stoy et al. | 525/336 |
| 3,926,930 | 12/1975 | Ohfuka et al. | 525/377 |
| 3,948,870 | 4/1976 | Stoy et al. | 525/336 |
| 4,169,924 | 10/1979 | Barabas et al. | 525/377 |

*Primary Examiner*—Carman J. Seccuro
*Attorney, Agent, or Firm*—Louis E. Marn; Elliot M. Olstein

[57] ABSTRACT

There is disclosed novel block copolymers formed of acrylonitrile sequences and sequences containing at least about 50 mole percent of acrylamide units and at most about 50 mole percent organo-substituted amide units and formed by reacting a block copolymer having acrylonitrile sequences and sequences of glutarimide units with a low molecular weight compound having a functional group selected from the group consisting of primary amino and secondary amino group. The reaction is effected at a pH of about 7.5 and higher, preferably in the presence of a solvent and/or swelling agent.

7 Claims, No Drawings

NOVEL BLOCK COPOLYMERS INCLUDING ACRYLONITRILE SEQUENCES AND SEQUENCES INCLUDING UNITS DERIVED FROM GLUTARIMIDE UNITS AND PROCESSES FOR PREPARING SAME

This is a continuation-in-part of Application Ser. No. 166,032 filed July 7, 1980 and a continuation-in-part of Application Ser. No. 06/188,060 filed Sept. 17, 1980, now U.S. Pat. No. 4,337,327.

FIELD OF INVENTION

This invention relates to novel block copolymers including acrylonitrile sequences, and more particularly to novel block copolymers comprised of acrylonitrile sequences and sequences including as a major portion units derived from glutarimide units and processes for preparing same.

BACKGROUND OF THE INVENTION

In copending application United States Ser. No. 188,244 filed Sept. 17, 1980, there are disclosed novel block copolymers compositions comprised of acrylonitrile sequences and sequences of glutarimide units of a molecule weight of from about 10,000 to about 2,000,000 where the acrylonitrile sequences and sequences including glutarimide units are of a molecular weight of at least about 400 with the number of sequences being at least about 2 and preferably 5 and higher. The resulting block compolymers are relatively stable with regard to acids even at elected temperatures, but are reactive to basic materials.

OBJECTS OF THE INVENTION

An object of the present invention is to provide novel block copolymers.

Another object of the present invention is to provide novel block copolymers having acrylonitrile sequences and sequences including units derived from glutarimide units.

Still another object of the present invention is to provide novel block copolymers having acrylonitrile sequences and sequences including units derived from glutarimide units yielding swellable but water insoluable hydrogels.

Still another object of the present invention is to provide novel processes for preparing such novel block copolymers.

SUMMARY OF THE INVENTION

These and other objects of the present invention are achieved by reacting a block copolymer having acrylonitrile sequences and sequences of glutarimide units with a low molecular weight compound having a functional group selected from the group consisting of primary amino and secondary amino, and to form novel block copolymers having acrylonitrile sequences and sequences containing at least about 50 mole percent of acrylamide units and at most about 50 mole percent of organo-substituted amide units. The reaction is effected at a pH of about 7.5 and higher, preferably in the presence of a solvent and/or swelling agent.

BRIEF DESCRIPTION OF THE INVENTION

As described in the aforementioned copending application, the precursor block copolymers are comprised of acrylonitrile sequences and sequences including glutarimide units and of a molecular weight of from about 10,000 to about 2,000,000 where the acrylonitrile sequences and sequences including glutarimide units are of a molecular weight of at least 40 with the number of sequences being at least about 2 and preferably 5 and higher. Such block copolymers are essentially a two phase structure with an acrylonitrile and glutarimide domains wherein the acrylonitrile and the glutarimide domains exhibit an amorphous structure.

An acrylonitrile sequence is a continuous sequence of acrylonitrile units of a molecular weight of at least about 400, and preferably of at least about 600. The sequences including a major portion of glutarimide units is a continuous sequence having a molecular weight of at least about 400 and preferably at least about 750. The number of sequences per polymer chain is at least 2 and preferably from 5 or more.

The novel block copolymer compositions of the present invention are readily prepared by treating the precursor block copolymers having acrylonitrile sequences and sequences comprised of a major portion of glutarimide units with a low moleculr weight compound having a functional group selcted from the group consisting of primary amino and secondary amino group at a temperature of from about 0° to about 185° C., preferably of from 15° to 65° C. to form block copolymers having acrylonitrile sequences and sequences containing at least about 50 mole percent acrylamide units and at most about 50 mole percent organo-substituted amide units.

The reaction is effected at a pH of 7.5 or greater, preferably in the presence of a solvent and/or swelling agent for the precursor block copolymer. Reaction times are from about 1 to 600 minutes, preferably 10 to 120 minutes.

The reactions are carried out under mild conditions at which the —CN groups are not reactive thereby resulting in novel block copolymers wherein the acrylonitrile sequences thereof are of like acrylonitrile sequences of the precursor block copolymer. Thus, the glutarimide units are converted to acrylamide and organo-substituted amide units with the result that the flexible portion of the precursor block copolymer is converted to a major portion of hydrophobic groups i.e. effectively a hydrogel multiblock copolymer. An essential feature of the block copolymers of the present invention is that at least one acrylamide unit is in a closest vicinity to the aforementioned units.

The conversion of the hydrophobic block copolymers into hydrogels permits utilization thereof by the attendant shape change when in contact with water, such as:

1. Forming hydrogel layers on hydrophobic blocks copolymers for use to decrease drag in tubes, on propellers of ships, and for forming slippery layers on catheters, sound and other medical devices.

2. Sealing sand or soil by introducing powdered precursor block copolymer into such a substrate and thereafter converting the block copolymer to hydrogel particles by adding an alkali thereto.

3. Incorporating highly reactive groups into hydrogels where such reactive groups are effective in immobilizing enzymes.

The properties of the novel block copolymers are preselectable by varying the mole percent of acrylonitrile units to glutarimide units of the precursor block copolymers as well as by varying the number and the molecular weight of the sequences.

Recovery of the block copolymers of the present invention may be effected in a plurality of ways depending on the reaction system in which the novel block copolymers are formed. If the alkali is sufficiently volatile, the block copolymer is recovered by evaporation of the alkali, such as ammonia. The block copolymers are readily extracted from the reaction systems with a liquid miscible therewith but immiscible with the dissolved block copolymers. Such miscible liquids include water, aqueous solutions, low aliphatic alcohols, ketones, glycols and the like. The block copolymers may be recovered by neutralization of the alkali.

EXAMPLE OF THE INVENTION

The following example is illustrative of conditions for the process of the present invention and it is to be understood that the scope of the present invention is not to be limited thereby. that the scope of the invention is not to be limited thereby.

EXAMPLE I

A solution of a multiblock acrylonitrile-glutarimide-acrylamide copolymer of the following composition: 57.4 percent by weight of acrylonitrile units arranged into the sequences with average molecular weight of about 1,500, 33.2 percent by weight of glutarimide units and 9.4 percent by weight of acrylamide units arranged randomly into sequences with an average molecular weight of 1110, is heated to 75° C. and bubbled with dry air to remove HCl whereupon gaseous dimethylamine is introduced for a period of 6 hours with the solution being maintained at a temperature of 30° C. The resulting block copolymer is comprised of 59.7 mole percent of acrylonitrile, 23.8 mole percent acrylamide and 16.5 mole percent of N,N-dimethylacrylamide.

Numerous modifications and variations of the present invention are possible in light of the above teachings and, therefore, within the scope of the appended claims, the invention may be practiced otherwise than as particularly described.

What is claimed:

1. A novel block copolymer of a molecular weight of from 10,000 to 2,000,000 comprised of acrylonitrile sequences and sequences comprised of at least about 50 mole percent acrylamide units and organo-substituted amide units derived from glutarimide units, said acrylonitrile sequences having a molecular weight of at least 400, said sequence of said acrylamide and said organo-substituted amide units having a molecular weight of at least 400.

2. The block copolymer as defined in claim 1 wherein said molecular weight of said acrylonitrile sequences is preferably at least 600 and said molecular weight of said sequences comprised of acrylamide units and said organo-substituted amide units is preferably at least 750.

3. The block copolymer as defined in claim 2 wherein there are at least two acrylonitrile sequences and at least two of the sequences comprised of acrylamide units and said organo-substituted amide units.

4. The block copolymer as defined in claim 3 wherein said acrylonitrile sequences equal the sequences comprised of acrylamide units and said organo-substituted amide units.

5. The block copolymer as defined in claim 1 wherein said acrylonitrile sequences comprises from 1 to 99 mole percent of said block copolymer.

6. The block copolymer as defined in claim 5 wherein said acrylonitrile sequences comprises from 50 to 95 mole percent of said block copolymer.

7. The block copolymer as defined in claim 5 wherein said acrylonitrile sequences comprises from 1 to 50 mole percent of said block copolymer composition.

* * * * *

UNITED STATES PATENT AND TRADEMARK OFFICE
CERTIFICATE OF CORRECTION

PATENT NO. : 4,370,451
DATED : January 25, 1983
INVENTOR(S) : Vladimir A. Stoy

It is certified that error appears in the above-identified patent and that said Letters Patent is hereby corrected as shown below:

Column 3, line 17, after "stood" delete "that the scope of the present invention is not to be";

line 18, before "that" delete "limited thereby.".

Signed and Sealed this

*Eleventh* Day of *December 1984*

[SEAL]

*Attest:*

*Attesting Officer*

GERALD J. MOSSINGHOFF

*Commissioner of Patents and Trademarks*